US011134465B2

United States Patent
Bapat et al.

(10) Patent No.: US 11,134,465 B2
(45) Date of Patent: Sep. 28, 2021

(54) LOCATION DETERMINATION WITH A CLOUD RADIO ACCESS NETWORK

(71) Applicant: CommScope Technologies LLC, Hickory, NC (US)

(72) Inventors: Anil Bapat, Bangalore (IN); Naveen Shanmugaraju, Bangalore (IN)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 16/674,547

(22) Filed: Nov. 5, 2019

(65) Prior Publication Data

US 2020/0163044 A1 May 21, 2020

Related U.S. Application Data

(60) Provisional application No. 62/787,482, filed on Jan. 2, 2019.

(30) Foreign Application Priority Data

Nov. 17, 2018 (IN) .............................. 201811043331

(51) Int. Cl.
*H04W 64/00* (2009.01)
*G06N 20/00* (2019.01)
(Continued)

(52) U.S. Cl.
CPC .......... *H04W 64/006* (2013.01); *G06N 20/00* (2019.01); *H04L 25/0212* (2013.01);
(Continued)

(58) Field of Classification Search
CPC ... H04W 64/006; H04W 16/22; H04W 64/00; H04W 88/085; H04L 25/0212; H04L 25/0224; G06N 20/00
(Continued)

(56) References Cited

U.S. PATENT DOCUMENTS 6,397,073 B1 * 5/2002 Hottinen ................ G01C 21/30
455/456.5
2014/0099971 A1 4/2014 Lim et al.
(Continued)

FOREIGN PATENT DOCUMENTS

CN 107064913 A 8/2017
CN 108377546 A 8/2018

OTHER PUBLICATIONS

3GPP, "3rd Generation Partnership Project; Technical Specification Group Radio Access Network; Study on new radio access technology: Radio access architecture and interfaces (Release 14)", 3GPP TR 38.801 V14.0.0, Mar. 2017, pp. 1-91, 3GPP.
(Continued)

*Primary Examiner* — Michael Y Mapa
(74) *Attorney, Agent, or Firm* — Fogg & Powers LLC

(57) ABSTRACT

A communication system that includes a plurality of radio points is disclosed. Each radio point is configured to exchange radio frequency (RF) signals with a wireless device that transmits a Sounding Reference Signal (SRS) from a first physical location in a site; and extract at least one SRS metric from the SRS. The communication system also includes a baseband controller communicatively coupled to the plurality of radio points. The baseband controller is configured to determine a signature vector based on the at least one SRS metric from each of the plurality of radio points. The communication system also includes a machine learning computing system communicatively coupled to the baseband controller. The machine learning computing system is configured to use a machine learning model to determine location data for the first physical location of the wireless device based on the signature vector.

21 Claims, 6 Drawing Sheets

(51) Int. Cl.
H04L 25/02 (2006.01)
H04W 16/22 (2009.01)
H04W 88/08 (2009.01)

(52) U.S. Cl.
CPC ......... *H04L 25/0224* (2013.01); *H04W 16/22* (2013.01); *H04W 64/00* (2013.01); *H04W 88/085* (2013.01)

(58) Field of Classification Search
USPC .............................................. 455/456.1–457
See application file for complete search history.

(56) References Cited

U.S. PATENT DOCUMENTS

| | | | |
|---|---|---|---|
| 2015/0186693 A1 | | 7/2015 | Blair et al. |
| 2015/0256978 A1* | | 9/2015 | Ogale .................... H04W 4/38 |
| | | | 455/456.1 |
| 2015/0350921 A1* | | 12/2015 | Pulleti .................. H04W 16/22 |
| | | | 370/254 |
| 2016/0021503 A1 | | 1/2016 | Tapia |
| 2016/0037550 A1* | | 2/2016 | Barabell ............. H04W 72/046 |
| | | | 455/450 |
| 2017/0238139 A1* | | 8/2017 | Cui ....................... H04W 40/20 |
| | | | 455/456.5 |

OTHER PUBLICATIONS

Bapat, Anil et al., "Dynamic Sectorization in a System With Multiple Cloud Radio Access Networks", U.S. Appl. No. 16/674,566, filed Nov. 5, 2019, pp. 1-54, Published: US.

Shanmugaraju, Naveen et al., "Dynamic Quantized Signature Vector Selection for a Cloud Radio Access Network", U.S. Appl. No. 16/674,587, filed Nov. 5, 2019, pp. 1-42, Published: US.

International Searching Authority, "International Search Report and Written Opinion from PCT Application No. PCT/US2019/059910", from Foreign Counterpart to U.S. Appl. No. 16/674,547, dated Feb. 25, 2020, pp. 1-11, Published: US.

Raghothaman, Balaji B, "Location Determination in a Cloud Radio Access Network Utilizing Image Data", U.S. Appl. No. 16/783,479, filed Feb. 6, 2020, pp. 1-45, Published: US.

* cited by examiner

LOCATION DETERMINATION WITH A CLOUD RADIO ACCESS NETWORK

CROSS-REFERENCE TO RELATED APPLICATIONS

This application claims the benefit of Indian Provisional Patent Application Serial No. 201811043331 filed on Nov. 17, 2018, entitled "LOCATION DETERMINATION WITH A CLOUD RADIO ACCESS NETWORK"; and U.S. Provisional Patent Application Ser. No. 62/787,482 filed on Jan. 2, 2019, entitled "LOCATION DETERMINATION WITH A CLOUD RADIO ACCESS NETWORK", the entirety of both of which are incorporated herein by reference.

BACKGROUND

Location-based services may be used in a variety of contexts. It may be desirable to track locations of wireless devices indoors without imposing additional requirements on the wireless devices or user behavior. Accordingly, the present systems and methods describe location determination with a cloud radio access network (C-RAN).

SUMMARY

A communication system that includes a plurality of radio points is disclosed. Each radio point is configured to exchange radio frequency (RF) signals with a wireless device that transmits a Sounding Reference Signal (SRS) from a first physical location in a site; and extract at least one SRS metric from the SRS. The communication system also includes a baseband controller communicatively coupled to the plurality of radio points. The baseband controller is configured to determine a signature vector based on the at least one SRS metric from each of the plurality of radio points. The communication system also includes a machine learning computing system communicatively coupled to the baseband controller. The machine learning computing system is configured to use a machine learning model to determine location data for the first physical location of the wireless device based on the signature vector.

A method for determining a first physical location of a wireless device is also disclosed. The method includes transmitting, from the wireless device, a Sounding Reference Signal (SRS) from a first physical location, wherein the SRS is received by a plurality of radio points. The method also includes extracting, by each of the plurality of radio points, at least one SRS metric from the SRS. The method also includes determining a signature vector based on the at least one SRS metric from each of the plurality of radio points. The method also includes using a machine learning model to determine location data for the first physical location of the wireless device based on the signature vector.

DRAWINGS

Understanding that the drawings depict only exemplary configurations and are not therefore to be considered limiting in scope, the exemplary configurations will be described with additional specificity and detail through the use of the accompanying drawings, in which.

In accordance with common practice, the various described features are not drawn to scale but are drawn to emphasize specific features relevant to the exemplary configurations.

DETAILED DESCRIPTION

Conventional real-time tracking of user location in indoor spaces suffers from several drawbacks. Some indoor location tracking mechanisms include (1) triangulation-based, e.g., using Wi-Fi access points; (2) sensor-based where sensors (e.g., Bluetooth sensor) are installed at key indoor locations; and (3) radio-frequency identification (RFID)-based systems. These systems require the users to enable Wi-Fi, Bluetooth, or have RFID tags, respectively. Furthermore, GPS-based tracking is usually not available in indoor spaces.

C-RANs may perform Sounding Reference Signal (SRS)-based localization to determine the set of Radio-Points (RPs) that form a cell (e.g., a virtual cell) for a user. In other words, SRSs may be used to locate wireless devices at the granularity of RPs. A more fine-grained localization, may be performed using a machine learning algorithm, such as K-Nearest Neighbor (kNN) and/or Support Vector Machines (SVMs). In addition to received SRS power at the various radio points, the channel estimates (e.g., that are used for equalization), may be used to obtain channel impulse response measurements which may be used to form a signature vector of a user.

Accordingly, the present systems and methods describe a C-RAN (e.g., in an LTE network) that may be used to determine and/or track indoor location of users in a transparent manner without imposing additional requirements on the wireless devices or user behavior. For example, a wireless device need not have Wi-Fi or Bluetooth enabled, nor would it require an RFID tag (or other sensor for location tracking). Rather, using the systems and methods described herein, the physical location of any wireless device that is indoors in the C-RAN coverage area may be automatically determined and/or tracked. Therefore, the present systems and methods provide an advantage over other available indoor positioning systems. The unique architecture of a C-RAN, with a centralized baseband controller and distributed radio points (e.g., compared to macro base stations), may be particularly well equipped to support relatively fine-grained, real-time indoor location determination and/or tracking of devices that are connected to C-RAN.

Additionally, this type of tracking may be inherently anonymous, thus preserving user privacy. Since the location of a user is tracked via a temporary identifier called the RNTI (Radio Network Temporary Identifier), the location tracking system herein has no access to the permanent identity of the user such as his phone number, or IMSI. So, the mechanism is inherently anonymous, guaranteeing user privacy.

Figure 1A:
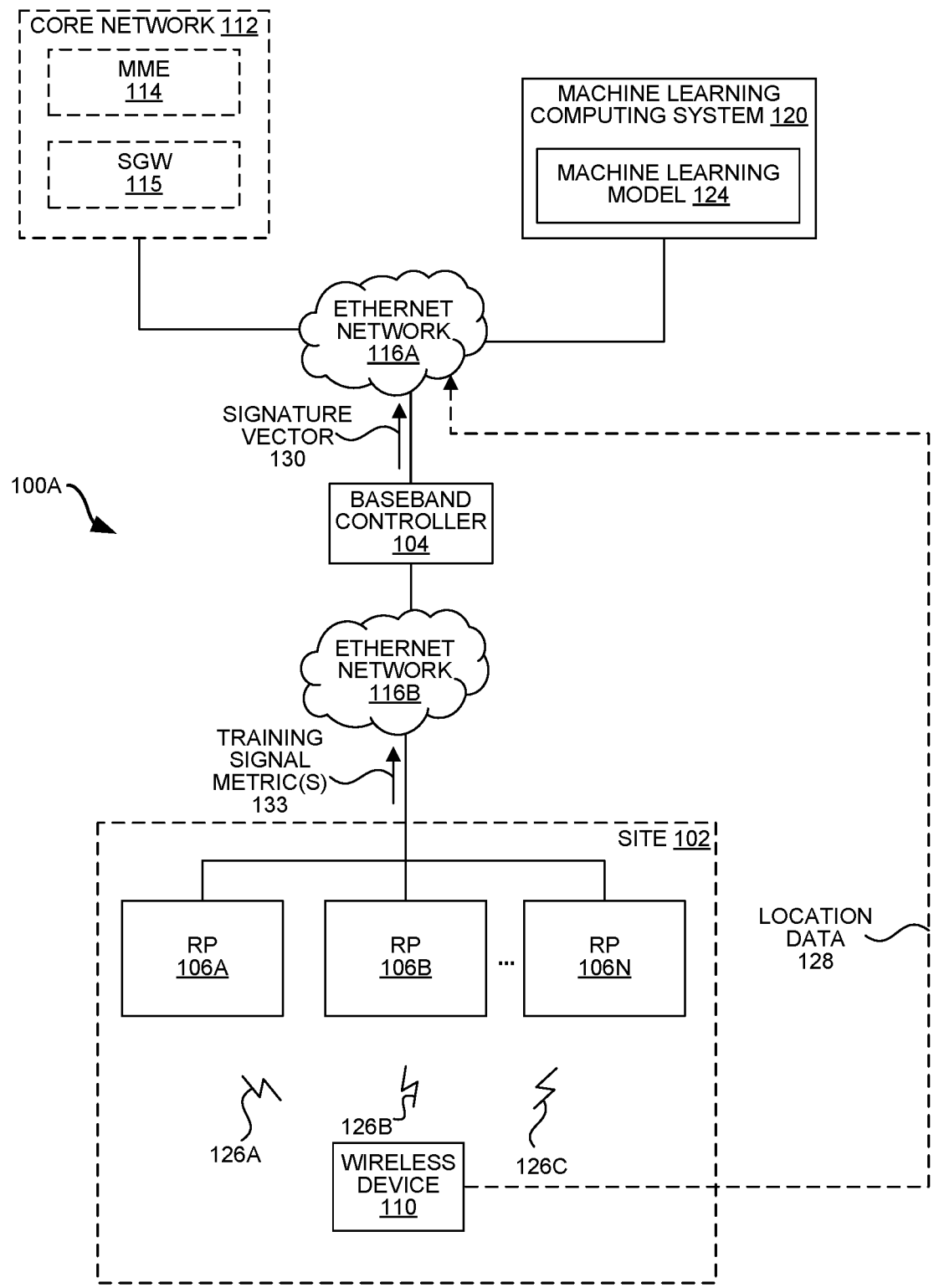
FIG. 1A is a block diagram illustrating an exemplary configuration of a system during a training phase.
Figure 1B:
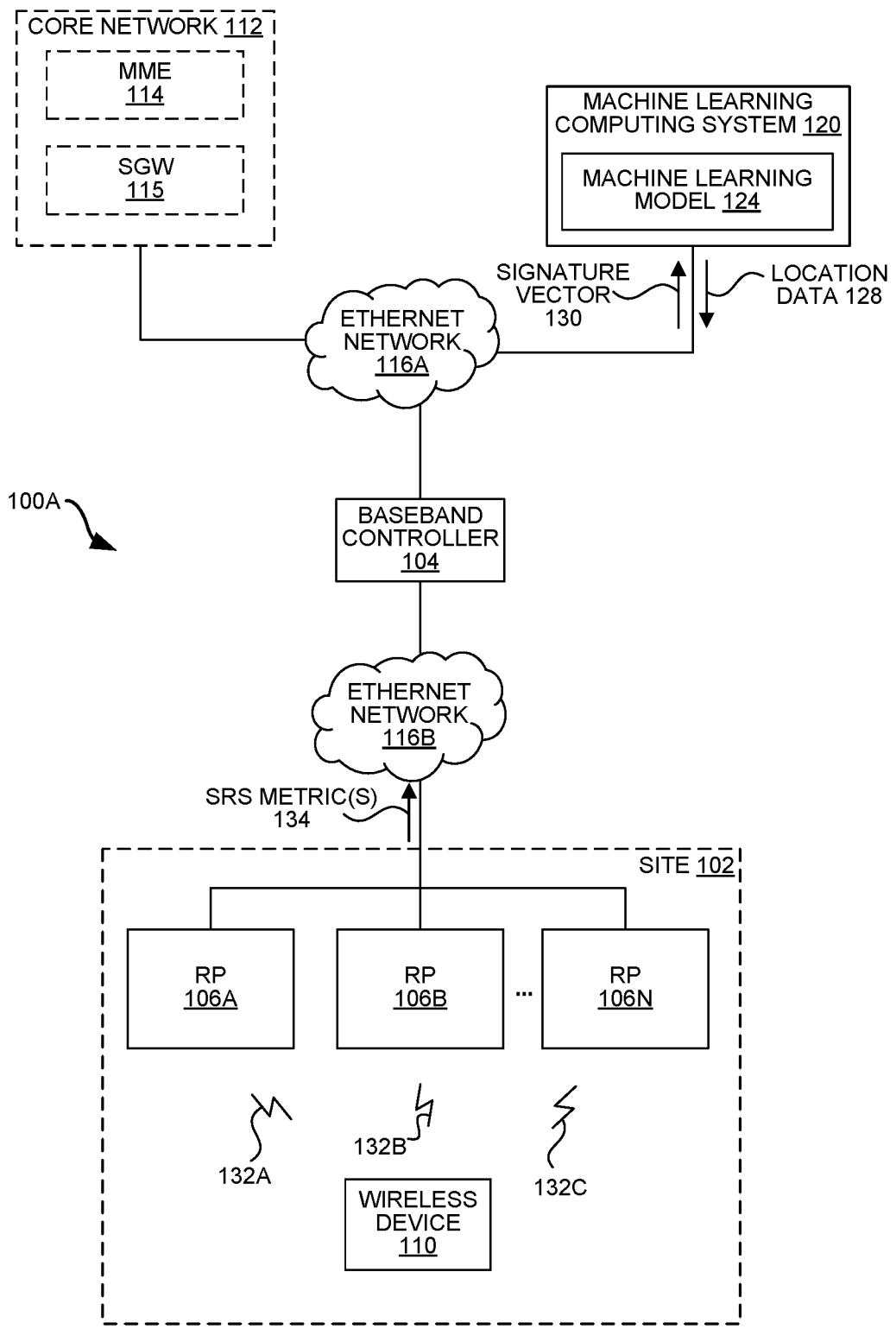
FIG. 1B is a block diagram illustrating an exemplary configuration of a system during an online phase.

FIGS. 1A-1B are block diagrams illustrating exemplary configurations of a system 100A for indoor location determination and/or tracking. The system 100A is deployed at a site 102 to provide wireless coverage and capacity for one or more wireless network operators. The site 102 may be, for example, a building or campus or other grouping of buildings (used, for example, by one or more businesses, governments, other enterprise entities) or some other public venue (such as a hotel, resort, amusement park, hospital, shopping center, airport, university campus, arena, or an outdoor area such as a ski area, stadium or a densely-populated downtown area). In some configurations, the site 102 is at least partially indoors, but other alternatives are possible.

In the exemplary configuration shown in FIGS. 1A-1B, the system 100A is implemented using the cloud radio access network (C-RAN) (point-to-multipoint distributed base station) architecture that employs at least one (and optionally multiple) baseband unit 104 and multiple (i.e., N) radio points (RPs) 106A-N that serve at least one cell. The system 100A may also be referred to here as a "C-RAN," "C-RAN system," and/or an "eNodeB" (or "eNB"). The baseband unit 104 is also referred to here as "baseband controller" 104 or just "controller" 104. Each RP 106 may include or be coupled to at least one (e.g., two) antennas via which downlink RF signals are radiated to wireless devices 110 and via which uplink RF signals transmitted by wireless devices 110 are received. It should be noted that the baseband controller(s) 104 may or may not be located at the site 102 (with the RPs 106).

Each wireless device 110 may be a computing device with a processor that executes instructions stored in memory, e.g., a mobile phone, tablet computer, mobile media device, mobile gaming device, laptop computer, vehicle-based computer, a desktop computer, etc. It should be noted that while the techniques are described (and Figures illustrated) with a single wireless device 110, many wireless devices 110 may be present at the site 102 and located and/or tracked.

The system 100A is coupled to the core network 112 of each wireless network operator over an appropriate back-haul ETHERNET network 116A. For example, the Internet may be used for back-haul between the system 100A and each core network 112. However, it is to be understood that the back-haul ETHERNET network 116A can be implemented in other ways. The ETHERNET networks 116 described herein may be implemented with one or more switches, routers, and/or other networking devices.

The system 100A may be implemented as a Long Term Evolution (LTE) radio access network providing wireless service using an LTE air interface. However, it should be noted that the present systems and methods may be used with other wireless protocols, e.g., 5G. LTE is a standard developed by 3GPP standards organization. In this configuration, the baseband controller 104 and RPs 106 together are used to implement an LTE Evolved Node B (also referred to here as an "eNodeB" or "eNB"). An eNB may be used to provide wireless devices 110 with mobile access to the wireless network operator's core network 112 to enable wireless device 110 to wirelessly communicate data and voice (using, for example, Voice over LTE (VoLTE) technology). The baseband controller 104 may be physically located remotely from the RPs 106, e.g., in a centralized bank of baseband controller 104. Additionally, the RPs 106 are physically separated from each other within the site 102, although they are each communicatively coupled to the baseband controller 104.

Also, in an exemplary LTE configuration, each core network 112 may be implemented as an Evolved Packet Core (EPC) 112 comprising standard LTE EPC network elements such as, for example, a mobility management entity (MME) 114 and a Serving Gateway (SGW) 115 and, optionally, a Home eNB gateway (HeNB GW) (not shown) and a Security Gateway (SeGW) (not shown).

Moreover, in an exemplary LTE configuration, each baseband controller 104 may communicate with the MME 114 and SGW 115 in the EPC core network 112 using the LTE S1 interface and communicates with eNBs using the LTE X2 interface. For example, the baseband controller 104 can communicate with an outdoor macro eNB (not shown) via the LTE X2 interface.

Each baseband controller 104 and radio point 106 can be implemented so as to use an air interface that supports one or more of frequency-division duplexing (FDD) and/or time-division duplexing (TDD). Also, the baseband controller 104 and the radio points 106 can be implemented to use an air interface that supports one or more of the multiple-input-multiple-output (MIMO), single-input-single-output (SISO), single-input-multiple-output (SIMO), multiple-input-single-output (MISO), and/or beam forming schemes. For example, the baseband controller 104 and the radio points 106 can implement one or more of the LTE transmission modes. Moreover, the baseband controller 104 and the radio points 106 can be configured to support multiple air interfaces and/or to support multiple wireless operators.

In the exemplary configurations shown in FIG. 1A-1B, the front-haul that communicatively couples each baseband controller 104 to the one or more RPs 106 is implemented using a standard ETHERNET network 116B. However, it is to be understood that the front-haul between the baseband controller 104 and RPs 106 can be implemented in other ways.

The Third Generation Partnership Project (3GPP) has adopted a layered model for the LTE radio access interface. Generally, the baseband controller 104 and/or RPs 106 perform analog radio frequency (RF) functions for the air interface as well as digital Layer 1, Layer 2, and Layer 3 (of the 3GPP-defined LTE radio access interface protocol) functions for the air interface.

In one example, each baseband controller 104 comprises Layer 3 (L3) functionality, Layer 2 (L2) functionality, and Layer 1 (L1) functionality configured to perform at least some of the L3 processing, L2 processing, and L1 processing, respectively, for the LTE air interface implemented by the system 100A, and each RP 106 includes (optionally) L1 functionality that implements any L1 processing for the air interface that is not performed in the baseband controller 104 and one or more radio frequency (RF) circuits that implement the RF front-end functions for the air interface and the one or more antennas associated with that RP 106.

Other possible functional splits between the baseband controller 104/RPs 106 of the L1-L3 processing for the air interface include: (1) all L1-L3 processing in baseband controller 104; (2) all L2 and L3 processing in baseband controller 104/all L1 processing in RPs 106; (3) all L3 and some L2 processing in baseband controller 104/all L1 and some L2 processing in RPs 106; (4) all L3 processing in baseband controller 104/all L1-L2 processing in RPs; (5) some L3 processing in baseband controller 104/some L3 and all L1-L2 processing in the RPs 106. In some configurations, all RF front-end processing for the air interface and the one or more antennas is performed in the RPs 106, e.g., the baseband controller 104 does not perform any RF processing for the air interface or the antennas (although other configurations are possible).

In some configurations (e.g., where all the L1-L3 processing is performed in the baseband controller 104), IQ data representing time-domain symbols for the air interface is communicated between the baseband controller 104 and the RPs 106. Communicating such time-domain IQ data typically requires a relatively high data rate front haul. This approach (communicating time-domain IQ data over the front haul) is suitable for those implementations where the front-haul ETHERNET network 116B is able to deliver the required high data rate.

If the front-haul ETHERNET network 116B is not able to deliver the data rate needed to front haul time-domain IQ data (for example, where the front-haul is implemented using typical enterprise-grade ETHERNET networks), this issue can be addressed by communicating IQ data representing frequency-domain symbols for the air interface between the baseband controller 104 and the RPs 106. This frequency-domain IQ data represents the symbols in the frequency domain before the inverse fast Fourier transform (IFFT) is performed. The time-domain IQ data can be generated by quantizing the IQ data representing the frequency-domain symbols without guard band zeroes or any cyclic prefix and communicating the resulting compressed, quantized frequency-domain IQ data over the front-haul ETHERNET network 116B.

Where frequency-domain IQ data is front-hauled between the baseband controller 104 and the RPs 106, each baseband controller 104 can be configured to perform all or some of the digital L3, L2, and L1 processing for the air interface. In this case, the L1 functions in each RP 106 can be configured to implement the digital L1 processing for the air interface that is not performed in the baseband controller 104. For example, in this exemplary configuration, each baseband controller 104 may implement a receiver and a scheduler for the cell.

Where the front-haul ETHERNET network 116B is not able to deliver the data rate need to front haul (uncompressed) time-domain IQ data, the time-domain IQ data can be compressed prior to being communicated over the ETHERNET network 116B, thereby reducing the data rate needed communicate such IQ data over the ETHERNET network 116B.

Data can be front-hauled between the baseband controller 104 and RPs 106 in other ways (for example, using front-haul interfaces and techniques specified in the Common Public Radio Interface (CPRI) and/or Open Base Station Architecture Initiative (OBSAI) family of specifications).

Although not shown, a management system may be communicatively coupled to the baseband controller 104 and RPs 106, for example, via the ETHERNET network 116A and the ETHERNET network 116B (in the case of the RPs 106). The management system may send and receive management communications to and from the baseband controller 104, each of which in turn forwards relevant management communications to and from the RPs 106.

A machine learning computing system 120 may be communicatively coupled to the baseband controller 104 (e.g., via the ETHERNET network 116A) and the RPs 106 (e.g., via the ETHERNET network 116B). The machine learning computing system 120 may be a general-purpose computing device (e.g., server) equipped with at least one (and optionally more than one) graphics processing unit (GPU) for faster machine-learning-based processing. In one configuration, the machine learning computing system 120 is implemented in more than one physical housing, each with at least one GPU. The machine learning computing system 120 may serve machine-learning-based, data-driven services to the system 100A. The machine learning computing system 120 may also be the host for a machine learning model 124, e.g., that performs indoor location determination and/or tracking. The machine learning computing system 120 may be coupled to and serve a single system 100A or multiple systems 100A (e.g., each with at least one baseband controller 104 and multiple RPs 106) based on deployment needs and scale.

The machine learning computing system 120 may train the machine learning model 124 based on at least one parameter derived from at least one signal (and/or the signal(s) themselves) received at the RPs 106 (from the wireless device 110). The signal(s) may include a Sounding Reference Signal (SRS) or any other type (or combination) of signal received at the RPs 106 from the wireless device(s) 110. The parameter(s) (used to train the machine learning model 124) may characterize the signal(s), and may be processed to form a signature vector 130, which is associated with a particular location of the wireless device 110.

Each wireless device 110 (e.g., LTE devices) may periodically transmit an SRS on the uplink. For example, each wireless device 110 may transmit SRS once every 80 ms or every 160 ms, e.g., the interval may be determined dynamically based on the loading on the system 100A. In other words, each wireless device 110 connected to the system 100A may transmit an SRS every 80-160 ms. Alternatively, other SRS intervals may be used in the system 100A.

As described above, the system 100A may be implemented with a C-RAN architecture that includes a centralized baseband controller 104 and multiple distributed radio points (RPs) 106. The RPs 106 may be strategically located across the entire site 102 to provide optimal coverage to all physical locations in the site 102. In some configurations, each of the RPs 106 may receive an SRS from each of the connected wireless devices 110 and report the power of the received SRS to the baseband controller 104. The SRS power measurements may serve as one of the inputs to the training and/or online phases of the physical location determination described herein. In addition, the RPs 106 may determine a channel impulse response of each wireless device 110 (determined from the uplink SRS transmission from the respective wireless device 110), which can serve as another input for the training and/or online phases of the physical location determination. Therefore, a signature vector 130 may be determined based on an SRS power measurement and/or a channel impulse response for each wireless device 110 (measured at each RP 106), and the signature vector 130 may be used to train the machine learning computing system 120 and/or determine a physical location of a wireless device 110. Additionally, or alternatively, the signature vector 130 for a wireless device 110 may be based on: (1) the angle of arrival measured at different RPs 106, e.g., for an SRS; and/or (2) at least one previous signature vector 130 for the wireless device 110.

Each baseband controller 104, RP 106, and/or machine learning computing system 120 (and the functionality described as being included therein) can be implemented in hardware, software, or combinations of hardware and software, and the various implementations (whether hardware, software, or combinations of hardware and software) can also be referred to generally as "circuitry" or a "circuit" configured to implement at least some of the associated functionality. When implemented in software, such software can be implemented in software or firmware executing on one or more suitable programmable processors. Such hardware or software (or portions thereof) can be implemented in other ways (for example, in a field programmable gate array (FPGA), application specific integrated circuit (ASIC), etc.). Also, the RF functionality can be implemented using one or more RF integrated circuits (RFICs) and/or discrete components. Each baseband controller 104, RP 106, and/or machine learning computing system 120 can be implemented in other ways.

FIG. 1A is a block diagram illustrating an exemplary configuration of the system 100A during a training phase. The training may be performed before, during, and/or after an online phase. The training may be performed in a single, contiguous period of time, or it may be performed initially then updated one or more times. During training, the machine learning computing system 120 may train a machine learning model 124 based on at least one parameter derived from at least one signal (and/or the signal(s) themselves) received at the RPs 106 (from the training wireless device 110).

It is very difficult to explicitly model indoor radio propagation environments, due to the non-homogeneity of obstructions like walls, furniture etc. As a result, using such models to determine the indoor location of a mobile may not yield accurate results. For example, using a mathematical model to determine the indoor location of a training wireless device 110 based only on SRS power received from each RP 106 may be inaccurate due to walls and other obstructions common in indoor spaces. Such a scheme may work when there is proper line of sight between the training wireless device 110 and the RPs 110 at each physical location, but such line of sight is often not available indoors. Accordingly, modeling every path loss possibility in all kinds of indoor spaces accurately is inaccurate, impractical and/or impossible.

Instead, the machine learning computing system 120 may train the machine learning model 124 to determine accurate indoor location of the training wireless device 110. Specifically, a relative SRS power (received by each RP 106 from the training wireless device 110) may be used as an input to determine a "signature vector 130" (SV) for the training wireless device 110. A signature vector 130 may be a set of data that is based on one or more operating conditions in the system 100A. In one example, a signature vector may be used to, at least partially, characterize a physical location of a wireless device 110 and/or channel conditions at the physical location, e.g., the signature vector can be based on at least one signal and/or channel metric measured at multiple RPs 106. For example, the relative SRS power may be a signal-to-noise plus interference ratio (SNIR) metric. A signature vector 130 may be determined for each training wireless device 110. For example, a signature vector 130 may be determined based on at least receive power measurements made at each of the RPs 106 for uplink transmissions (e.g., SRS) from the training wireless device 110.

In addition to the relative SRS power, a channel impulse response for a training wireless device 110 may also be used as input to determine the signature vector 130 for a training wireless device 110. In indoor locations, there is a rich multipath environment. So, the uplink SRS signal sent by the wireless device 110 may reach the RPs 106 over multiple paths, which leads to multiple signal amplitudes measured with small delays. So, each RP 106 may measure these various signal amplitudes as well as the delay times and form a vector of these measurements, which is the channel impulse response of the SRS signal. Channel impulse response measurements of a wireless device's 110 SRS signal from all the RPs 106 in the site 102 may be strongly correlated with the user's pinpointed location, taking into effect both the distances of the wireless device 110 from each RP 106 as well as the unique multipath characteristics of that particular location of the wireless device 110 relative to each RP 106. Utilizing the channel impulse responses (in addition to using an average SRS power from every RP 106) as part of the wireless device's 110 signature vector may increase accuracy of the indoor location determination and/or tracking.

Additionally, or alternatively, other inputs may be used to determine a signature vector 130 to further improve accuracy, including the angle of arrival measured at different RPs 106 (e.g., for an SRS) and/or at least one previous signature vector 130 for the training wireless device 110. For example, at least one previous signature vector 130 with a strong correlation to a current position of the training wireless device 110 may be used for training since the training wireless device 110 will not have moved very far during a 80-160 ms SRS interval. The signal reception metrics that are determined based on the SRS transmissions received at the RPs 106 (from a training wireless device 110) may also be referred to as "SRS metrics."

Each signature vector 130 for a training wireless device 110 may be iteratively determined/updated (while that training wireless device 110 is connected to the system 100A) based on SRS signals transmitted by the training wireless device 110. For example, the signature vector for a wireless device 110 may be determined/updated every SRS interval, e.g., every 80-160 ms depending on system 100A loading. In some configurations, the signature vectors 130 are determined (from the SRS metric(s)) at the baseband controller 104, however, other configurations are possible, e.g., where the signature vectors 130 are determined at the RPs 106 and/or the machine learning computing system 120. Each signature vector 130 may be a set of floating point signal-to-interference-plus-noise ratio (SINR) values (or other metric), with each value or element corresponding to a different RP 106 in the system 100A.

Once a signature vector 130 is determined (e.g., derived from at least one SRS metric measured by multiple RPs 106), it may be used to train a machine learning model 124. Specifically, each signature vector 130, along with a corresponding location, may act as training data for the machine learning model 124. The model may implement a machine learning algorithm, e.g., K-Nearest Neighbor (kNN) and/or Support Vector Machines (SVMs).

The training may be performed offline, for example, during walk tests in early-deployment days at the site 102 by the deployment personnel. The training may be performed during one or more days, e.g., shortly after the system 100A is deployed at the site 102 (such as a stadium or retail mall). This training may be part of a larger configuration performed to identify typical traffic and user density/movement conditions in the system 100A and/or tune the system 100A for such conditions. Additionally, although the training is described with a single training wireless device 110, it may simultaneously involve multiple training wireless devices 110.

A training wireless device 110 may download and execute a mobile application to assist with training. The mobile application may present a user interface on the training wireless device 110, and a user may provide input using the user interface. Specifically, a user may provide user input to the training wireless device 110 to tag a physical location within the site 102. The tagging may include associating location data 128 with a timestamp. The location data 128 may be any data that identifies a physical location, e.g., Cartesian coordinates, latitude/longitude, etc. The user input may include pointing to a physical location on a displayed map of the site 102, selecting a physical location description from a dropdown menu, pressing a radio button identifying a physical location description, etc. The location data 128 may be transmitted to the machine learning computing system 120. In one configuration, the location data 128 may be manually uploaded to a computing device (not shown) that transmits the location data to machine learning computing system 120. In another configuration, the location data 128 is transmitted wirelessly to the RPs 106, then to the machine learning computing system 120 via the baseband controller 104.

Simultaneously (or nearly simultaneously) to a physical location being tagged, the training wireless device 110 may transmit a training signal 126A-C that is received at one or more RPs 106. The training signal 126 may be an SRS or any other suitable uplink signal. The training signal 126 may be received by at least one, and in some cases all, the RPs 106 in the system 100A.

In one configurations, the training signal 126 is transmitted periodically (e.g., every 80-160 ms). In the periodic configuration, a particular training signal 126 may be associated with particular location data 128 based on the timestamp associated with the particular location data 128 (during tagging) as well as a timestamp for receipt of the particular training signal 126 at the RPs 106.

In another configuration, the training signal 126 is transmitted only in response to the user tagging a physical location. In this configuration, a user tags a physical location with a particular timestamp (e.g., the mobile app may do this tagging based on the walk tester's trigger to make a recording using the mobile app's UI). The baseband controller 104 may continuously record the signature vectors of the user received from all the radio points and associate each signature vector with a timestamp. Now, using the timestamp, the input of the exact physical location from the wireless device 110 (via the app) and the signature vectors gathered by the baseband controller may be correlated together to form the training data required for the machine learning model.

The system 100A may automatically determine a signature vector 130 for each training wireless device 110 (with the mobile application running on it) during the training phase and transmit the signature vector 130 to the machine learning computing system 120. In some configurations, the RPs 106 may receive the training signal 126, then transmit at least one training signal metric 133 characterizing the training signal 126 (e.g., at least one SRS metric) to the baseband controller 104, which aggregates the training signal metric(s) 133 and determines a signature vector 130 using the training signal metric(s) 133. After the signature vector 130 is determined, it may be transmitted to the machine learning computing system 120, e.g., via the back-haul ETHERNET network 116A.

In one configuration, signature vectors may be created only at the baseband controller 104 based on the SRS average power and the channel impulse response inputs it gathers from every RP 106 in the system 100A. In this configuration, the RPs 106 may not have visibility into the signature vectors as they only have the SRS average powers and the channel impulse responses they measure for the wireless devices 110. However, a baseband controller 104 may have a collection of all of these readings from every RP 106, which it can use to determine the signature vector.

The machine learning computing system 120 may train the machine learning model 124 based on the received signature vector 130 and the location data 128. The machine learning model 124 may be a K-Nearest Neighbor (kNN) model, a Support Vector Machine (SVM), or any other model that employs machine learning. In one configuration, the training includes associating location data 128 with the signature vector 130 for a physical location, e.g., based on their respective timestamps. Since each signature vector 130 may be determined based on multiple training signal metrics 133 (e.g., signal strength of the training signal 126, channel estimate such as a channel impulse response, etc.), the machine learning model 124 may be used (after the training phase) to match a signature vector 130 to a physical location (represented by location data 128) in a pattern-matching manner. Various metrics may be used to determine signal strengths, e.g., RMS signal power, signal to interference noise ratio (SINR), signal to noise ratio (SNR), rise over thermal (ROT), interference over thermal (IOT), etc.

FIG. 1B is a block diagram illustrating an exemplary configuration of the system 100A during an online phase. The online phase may refer to a mode of system 100A operation that occurs (after the training phase illustrated in FIG. 1A) when the physical location of at least one wireless device 110 (at the site 102) is determined and/or tracked. Additionally, or alternatively, the online phase may occur in parallel with (or overlapping with) a training phase.

Once the machine learning model 124 is trained, it may be used to match a new signature vector 130 of the user (measured across the various RPs 106) to a physical location (represented by location data 128, e.g., coordinates) with high accuracy. Such machine learning models 124 may be more accurate and/or consistent than conventional triangulation methods that attempt to explicitly model the relation between radio measurements and physical location. The reason for this is the high variability of the radio-propagation environments at an indoor (or partially-indoor) site 102.

After entering the site 102 and connecting to the system 100A (e.g., including initial random access procedures), a wireless device 110 may periodically transmit a Sounding Reference Signal (SRS) 132A-C, e.g., every 80-160 ms. The SRS 132 may be received by at least one (e.g., all) RP(s) 106 in the system 100A. Each of the at least one RP 106 may extract at least one SRS metric 134 from the SRS 132. In some configurations, the extracted SRS metrics 134 include an SRS power measurement and/or a channel impulse response for the wireless device 110 (measured at each RP 106). Additionally, or alternatively, the SRS metric(s) may include: (1) the angle of arrival measured at different RPs 106, e.g., for the SRS 132; and/or (2) at least one previous signature vector 130 for the wireless device 110.

In some configurations, the SRS metric(s) 134 may be transmitted to the baseband controller 104, which aggregates the SRS metric(s) 134 and determines a signature vector 130 based on the SRS metric(s) 134. In other words, the average SRS power and Channel impulse response readings for an SRS signal from every RP 106 may be gathered/aggregated at a baseband controller 104 for a particular wireless device 110, then used to determine a signature vector for the wireless device 110. After the signature vector 130 is determined, it may be transmitted to the machine learning computing system 120, e.g., via the back-haul ETHERNET network 116A.

The machine learning computing system 120 may use the signature vector 130 as input to the machine learning model 124 to determine a physical location (as represented by location data 128) of the wireless device 110. In other words, the machine learning model 124 may match the received signature vector 130 to a closest-matching signature vector 130 measured during training. For example, the machine learning model 124 may identify a physical location using pattern-matching, e.g., where the signature vector 130 may be thought of as a multi-parameter pattern that is matched to a closest pattern of a signature vector 130 measured during training.

Machine learning methods are particularly useful in pattern-matching because, given the high variability of the radio environment conditions in indoor locations, it is not possible to come up with an accurate mathematical model to relate any of the measurements to the location of the user. Therefore, the machine-learning methods discussed herein may model the training data as the millions or billions of "labeled" vectors in multidimensional space. When a new set of measurements (e.g., a new signature vector) is given, the model is able to place this vector in the same multidimensional space and relate this vector to the "nearest" vectors which are "labeled", after which the label may be extracted based on the proximity of this new vector to the labeled vectors that form the training data.

In addition to locating a wireless device 110 within the site 102 (e.g., determining a user's physical location without knowledge of a user's previous physical location), the system 100A may also track a user, e.g., locating a wireless device's 110 current physical location, at least in part, based on a user's previous physical location. For example, once a wireless device 110 is located, tracking may be performed by inputting further measurements and/or at least one previous physical location to the trained machine learning model 124.

In general, tracking may match a sequence of signature vectors to a sequence of physical locations. This may be more accurate/robust than locating the user based simply on current signature-vector. Even if there are some errors in some signature vector measurements, since the sequence of locations are strongly correlated to each other, such errors may not result in errors in physical location. For example, if consecutive physical locations A, B, C are determined (and the sequence is not in the training data) and since location B is not actually near A, C, then the location-sequence may be corrected to A-D-C.

Location determination and/or tracking described herein may enable various value-added services to be provided to an operator. An "operator" may be an owner, employee, supervisor, administrator, manager, property manager, technician, vendor, and/or any other person (and/or entity) with responsibility or access privileges for the system 100A and/or the site 102. In some configurations, a third-party services provider (not shown) may receive (e.g., via an application programming interface (API)) location data 128 for wireless devices 110 in the system 100A and/or information derived from the location data 128, after which the third-party services provider may then provide the value-added services to the operator. Alternatively, the operator may receive the location data 128 and provide the value-added services.

First, real-time (or near real-time) location determination and/or tracking may be used to determine an accurate spatio-temporal heat map that describes one or more conditions of the system 100A and/or the site 102, e.g., channel conditions, traffic density, user density, and/or user movement patterns as a function of physical location and/or time. For example, the channel conditions experienced by wireless devices 110, their tonnage (e.g., traffic load on the system 100A), and/or their behavior may be determined and aggregated as a function of physical location and time to provide the operator a more complete description of network operations. The operator may then use this data to (1) appropriately configure the system 100A, e.g., install additional RPs 106, such as hotspot cells, at high density areas of the site 102; (2) optimize RP 106 placement, e.g., for regions having high traffic and sub-optimal channel conditions; and/or (3) re-draw sector boundaries, e.g., in response to high user movement in an area where a sector boundary occurs. It should be noted that a spatio-temporal heat map may be used for any suitable configuration, re-configuration, installation and/or other tasks associated with the system 100A and/or the site 102.

Second, the physical location determination and/or tracking may be used for anonymous user (e.g., wireless device 110) movement pattern mining. The location data 128 may be inherently anonymous. In other words, the location data 128 may indicate that a particular wireless device 110 is located at a certain point in the site 102 and/or is moving within the site 102, e.g., in a certain pattern. However, the location data 128 does not indicate an identity of the user of the wireless device 110. In other words, the location data 128 is not associated with a phone number or even an international mobile subscriber identity (IMSI) (e.g., the permanent identifier of a user and/or wireless device 110 within an LTE network) of the wireless device 110. Rather, the system 100A may only be aware of a temporary identifier of the user/wireless device 102 called the cell radio network temporary identifier (C-RNTI), and a permanent identifier cannot be determined from the C-RNTI. Therefore, the physical location determination and tracking described herein may be inherently anonymous and ensure privacy of the user. Furthermore, the location data 128 (e.g., provided to a third-party services provider) may only describe that an anonymous user is located at point X and is moving to point Y at this point of time, without sharing any detail of the user.

Using the user movement pattern mining, an operator (or third-party services provider) may be able to determine which areas have the most users/wireless devices 110 at a given time of the day. This may be useful to a retail shop owner, for example, to know when and/or how to adjust on-site 102 advertising, promotions, and/or other offers. Using the user movement pattern mining may, an operator (or third-party services provider) may also be able to determine (1) if there is any cross-store visit correlation, e.g., a probability the user/wireless device 110 will enter a second area within the site 102 (e.g., store) given that they previously entered a first area within the site 102 (e.g., store) or whether a user/wireless device 110 entered two or three different stores together in a single visit. Such determinations may provide insight to an operator, e.g., of a retail site 102.

Third, the physical location determination and/or tracking may be used for anomaly detection. By tracking real-time (or near real-time) user movement patterns, suspicious and/or anomalous movement patterns (e.g., that stray from normal established baselines by a threshold) may be detected. In one example, in an emergency scenario, many users/wireless devices 110 may frantically run around the site 102. In response, the site 102 operator (e.g., owner) and/or law enforcement may be alerted of a potential emergency. In another example, a site 102 operator (e.g., owner) and/or law enforcement may be alerted in response to identifying suspicious (e.g., abnormal) movement of one or more users/wireless devices 110 at unusual times (e.g., 4:00 AM).

It should be noted that, in addition to training, location determination, and/or tracking, the signature vectors 130 described herein may optionally be used to determine an RP 106 having the best signal reception metric for a wireless device 110, e.g., by scanning or sorting the elements of the signature vector 130 to find the element having the best signal reception metric. The RP 106 that corresponds to that "best" element may also referred to as the "primary RP" 106 for the wireless device 110.

Furthermore, a secondary cell signature vector 130 may be determined based on a primary cell signature vector 130 and a physical location for a wireless device 110. Additionally or alternatively, coordinated beamforming vectors may be determined based on a physical location for a wireless device 110.

Optionally, a "quantized signature vector 130" (QSV) may also be determined for each wireless device 110. A "simulcast zone" may be a subset of RPs 106 in the system 100A that are used to transmit to a wireless device 110, e.g., each wireless device 110 may have a simulcast zone that may or may not overlap with a simulcast zone for another wireless device 110. The QSV for each wireless device 110, then, may be a vector that includes an element for each RP 106, where each element has one of a finite set of values. For example, the element for each RP 106 has a first value (for example, a value of "1") if the corresponding RP 106 is included in the simulcast zone for that wireless device 110 and has second value (for example, a value of "0") if the corresponding RP 106 is not included in the simulcast zone for that wireless device 110. The QSV for each wireless device 110 can be determined using the SV for that wireless device 110.

The QSVs for the wireless devices 110 may be used to conveniently determine if the simulcast zones of two wireless devices 110 do not include any of the same RPs 106. That is, the QSVs for two wireless devices 110 can be used to conveniently determine if the simulcast zones for the two wireless devices 110 are disjoint. If this is the case, the simulcast zones for the wireless devices 110 (and the wireless devices 110 themselves) are referred to as being "orthogonal" to each other. This can be done, for example, applying a logical "AND" operation on corresponding elements of the two QSVs.

Figure 1C:
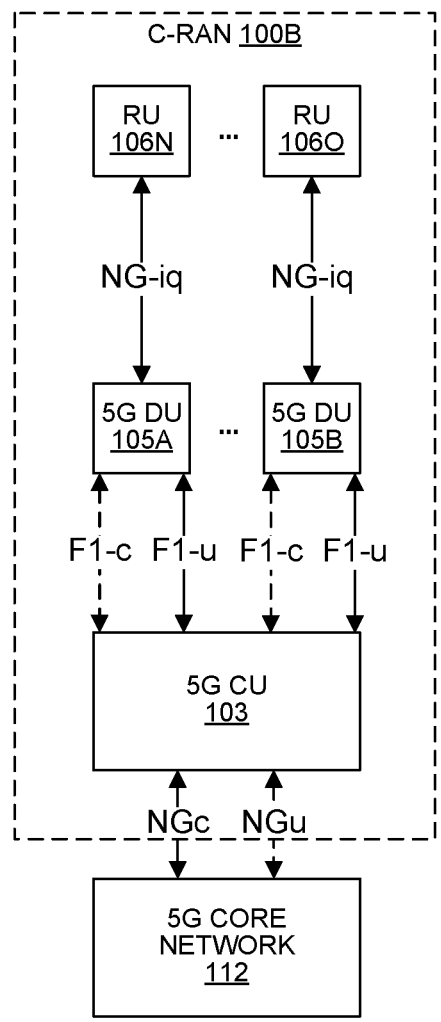
FIG. 1C is a block diagram illustrating another exemplary configuration of a system with a cloud radio access network (C-RAN)

FIG. 1C is a block diagram illustrating another exemplary configuration of a system 100B with a cloud radio access network (C-RAN). The system 100B includes 3GPP Fifth Generation (5G) components. Optionally, the system 100B may additionally include 4G components. Each of the components may be implemented using at least one processor executing instructions stored in at least one memory. In some configurations, at least some of the components are implemented using a virtual machine.

Fifth Generation (5G) standards support a wide variety of applications, bandwidth, and latencies while supporting various implementation options. In the system 100B, interfaces denoted with "-c" or simply "c" (illustrated with dashed lines) provide control plane connectivity, while interfaces denoted with "-u" or simply "u" (illustrated with solid lines) provide user plane connectivity. More explanation of the various devices and interfaces in FIG. 1C can be found in 3GPP TR 38.801 Radio Access Architecture and Interfaces, Release 14 (available at https://portal.3gpp.org/desktopmodules/Specifications/SpecificationDetails.aspx?specificationId=3056), which is incorporated by reference herein.

FIG. 1C illustrates a C-RAN 100B implementing an example of a 5G Next Generation NodeB (gNB). The architecture of a Next Generation NodeB (gNB) is partitioned into a 5G Central Unit (CU) 103, one or more 5G Distributed Unit (DU) 105A-B and one or more 5G Remote Units (RU) 106N-O. A 5G Central Unit (CU) 103 is a node that includes the gNB controller functions such as the transfer of user data, mobility control, radio access network sharing, positioning, session management, etc. The 5G CU 103 controls the operation of the Distributed Units (DUs) 105A-B over an interface (including F1-c and F1-u for the control plane and user plane, respectively).

The Distributed Units (DUs) 105 may be nodes that implement a subset of the gNB functions, depending on the functional split (between CU 103 and DU 105). In some configurations, the L3 processing (of the 5G air interface) may be implemented in the CU 103 and the L2 processing (of the 5G air interface) may be implemented in the DU 105. The operation of each DU 105 is controlled by a CU 103. The functions of the DU 105 may include Radio Link Control (RLC), portions of Medium Access Control (MAC) and/or portions of the physical (PHY) layer functions. A Distributed Unit (DU) 105 can optionally offload some of its PHY (L1) processing (of the 5G air interface) to RUs 106.

In FIG. 1C, the C-RAN 100B implementing the example Next Generation NodeB (gNB) includes a single CU 103, which handles control plane functions and user plane functions. The 5G CU 103 (in the C-RAN 100B) may communicate with at least one wireless service provider's Next Generation Cores (NGC) 112 using 5G NGc and 5G NGu interfaces. In some 5G configurations (not shown), a 5G CU is split between a CU-C 103B that handles control plane functions and a CU-U 103C that handles user plane functions.

In some 5G configurations, the RUs (RUs) 106N-O may communicate baseband signal data to the DUs 105 on an NG-iq interface. In some 5G configurations, the RUs 106 may implement at least some of the L1 and/or L2 processing. In some configurations, the RUs 106 may have multiple ETHERNET ports and can communicate with multiple switches.

Any of the interfaces in FIG. 1C may be implemented using a switched ETHERNET (or fiber) network. Additionally, if multiple CUs 103 are present (not shown), they may communicate with each other using any suitable interface, e.g., an Xn (Xn-c and Xn-u) and/or X2 interface. A fronthaul interface may facilitate any of the NG-iq, F1-c, and/or F1-u interfaces in FIG. 1C.

Although not shown in FIG. 1C, the system 100B may also include a machine learning computing system 120 with a machine learning model 124, which performs the location determination functions described herein. In some configurations, the machine learning computing system 120 may be communicatively coupled to the 5G CU 103 and/or the 5G core network 112 via an ETHERNET network. Accordingly, where functionality of a baseband controller 104 is discussed herein, it is equally applicable to a 5G CU 103 or 5G DU 105 in 5G configurations. Similarly, where functionality of an RP 106 is discussed herein, it is equally applicable to an RU 106 in 5G configurations. Therefore, where a system or C-RAN is described herein, it may include 4G components (as in FIG. 1A-B) and/or 5G components (as in FIG. 1C).

Figure 2:
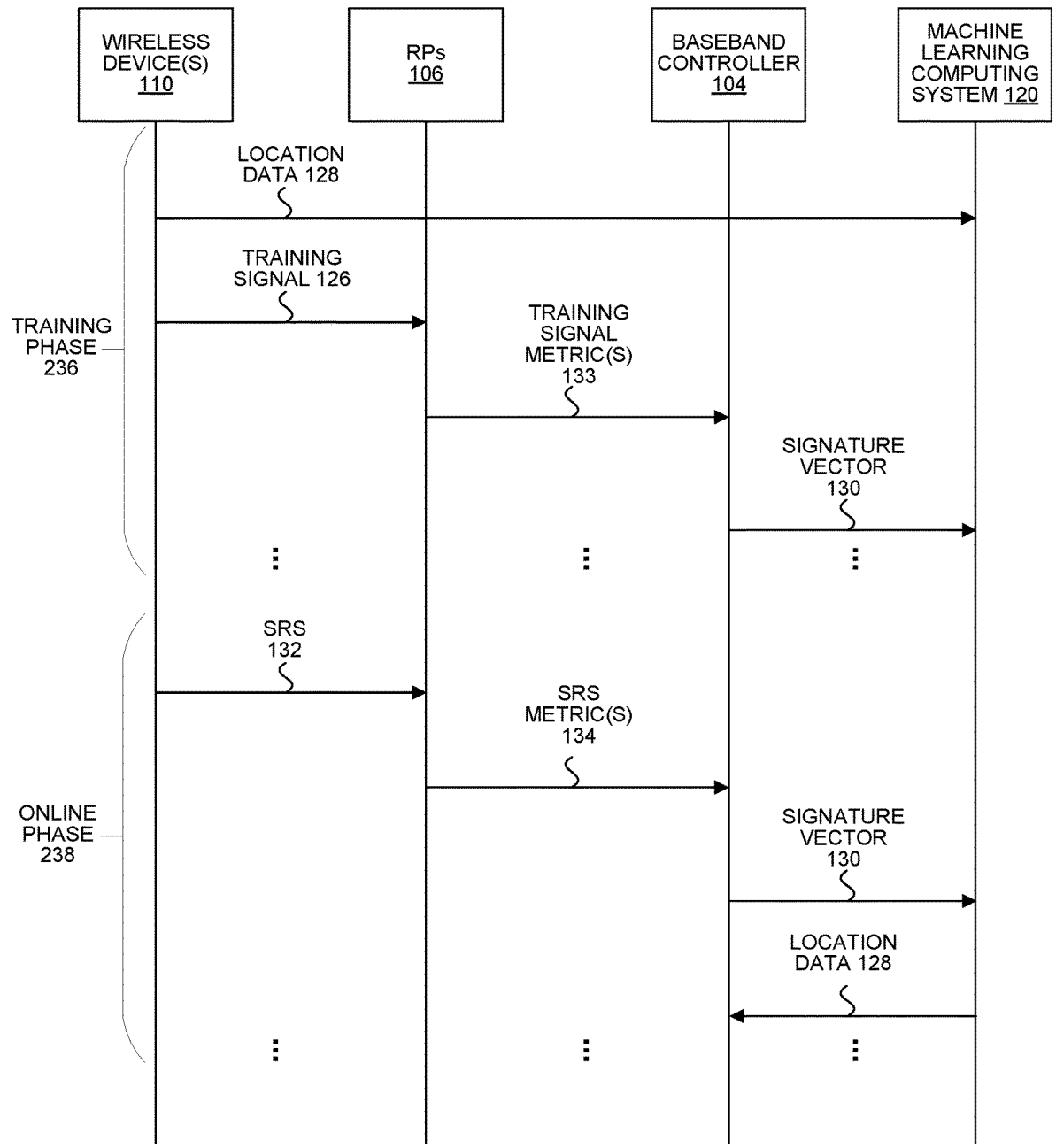
FIG. 2 is a sequence diagram illustrating signaling during a training phase and an online phase of a system.

FIG. 2 is a sequence diagram illustrating signaling during a training phase 236 and an online phase 238 of a system 100. The training phase 236 may occur before, during, and/or after the online phase 238. Additionally, there may be a significant gap in time between the training phase 236 and the online phase 238.

As described before, the system 100 may include multiple RPs 106, and at least one baseband controller 104. Additionally, a machine learning computing system 120 may implement a machine learning model 124 (e.g., based on SRS measurements) for physical location determination and/or tracking of wireless devices 110 at the site 102.

Furthermore, the training wireless device(s) 110 used during the training phase 236 may or may not also be used during the online phase 238. In other words, the training phase 236 may involve a first group of one or more training wireless devices 110, and the online phase 238 may involve a second group of one or more wireless devices 110, which may or may not overlap with the first group.

During the training phase 236, a training wireless device 110 may move to a first physical location in the site 102 and tag a first physical location. The tagging may include associating location data 128 (for the first physical location) with a timestamp. The location data 128 may be determined based on user input. The location data 128 (along with the timestamp of the tagging) may be transmitted to the machine learning computing system 120, e.g., manually uploaded in non-real-time or transmitted wirelessly to the RPs 106, then to the machine learning computing system 120 via the baseband controller 104.

Simultaneously (or nearly simultaneously) to the first physical location being tagged, the training wireless device 110 may transmit a training signal 126 that is received at least one of the RPs 106. The training signal 126 may be an SRS or any other suitable uplink signal.

The training signal 126 may be received by at least one (e.g., all) the RPs 106. In one configuration, the RPs 106 may receive the training signal 126, then transmit at least one training signal metric 133 characterizing the training signal 126 (e.g., a signal strength and/or a channel estimate) to the baseband controller 104. In this configuration, the baseband controller 104 determines a signature vector 130 based on the received training signal metric(s) 133 and sends it (along with the timestamp associated with the signature vector 130, e.g., a timestamp the signature vector was determined at the baseband controller 104) to the machine learning computing system 120.

The machine learning computing system 120 may correlate the signature vector 130 and the location data 128, e.g., using the timestamps associated with the signature vector 130 and the location data 128. In one configuration, the training includes associating location data 128 for the first physical location with the signature vector 130 for the training wireless device 110 at the first physical location. This association may be performed using the timestamp of the location data 128 and the timestamp that the training signal was received at the RP 106 (and the RNTI of the wireless device 110). The machine learning computing system 120 may also use the correlated location data 128 and received signature vector 130 to train a machine learning model 124, e.g., a K-Nearest Neighbor (kNN) model, a Support Vector Machine (SVM).

Additionally, although not explicitly shown in FIG. 2, the training may be an iterative process. For example, after the machine learning model 124 is trained with the received location data 128 and received signature vector 130, the training wireless device 110 (or a different training wireless device 110) at a second physical location in the site 102 may transmit additional location data 128 and an additional training signal 126. After which, the additional training signal metric(s) 133 and an additional signature vector 130 may be determined and used to further train the machine learning model 124.

During the online phase 238, after entering the site 102 and connecting to the system 100, a wireless device 110 may transmit a Sounding Reference Signal (SRS) 132, e.g., periodically. The SRS 132 may be received by at least one (e.g., all) RP(s) 106 in the system 100, and each receiving RP 106 may extract at least one SRS metric 134 from the SRS 132. The SRS metric(s) 134 extracted by each receiving RP 106 may include one or more of the following: (1) an SRS power measurement; (2) a channel impulse response for the wireless device 110; (3) an angle of arrival for the SRS 132; and/or (4) at least one previous signature vector 130 for the wireless device 110.

In one configuration, the SRS metric(s) 134 may be transmitted to the baseband controller 104, which aggregates the SRS metric(s) 134. In this configuration, the baseband controller 104 determines and sends the signature vector 130 to the machine learning computing system 120. Alternatively, after receiving the training signal 126, some combination of the RPs 106 may determine at least one SRS metric 134, determine a signature vector 130, and send the signature vector 130 to the machine learning computing system 120, e.g., via the baseband controller 104.

The machine learning computing system 120 may receive the signature vector 130 for the wireless device 130 (e.g., from the baseband controller 104), and use it to determine a current physical location of the wireless device 110. In other words, the machine learning model 124 in the machine learning computing system 120 may match the received signature vector 130 to a closest-matching signature vector 130 measured during the training phase 236. The output may be location data 128 associated with the current physical location of the wireless device 110. The location data 128 may be transmitted to the baseband controller 104 and/or a third-party services provider to enable various value-added services, e.g., spatio-temporal heat map generation, user movement pattern mining, and/or anomaly detection.

Figure 3:
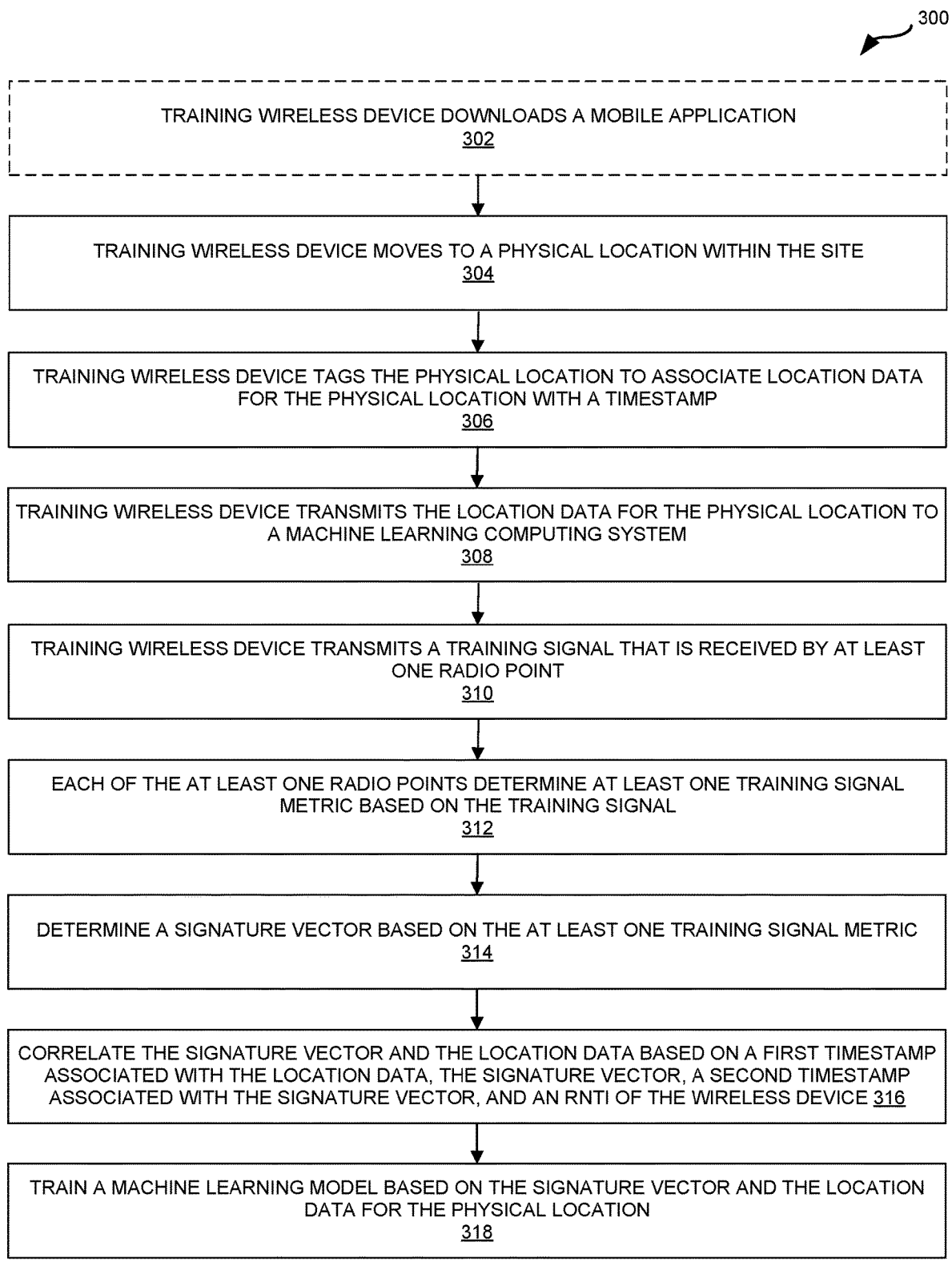
FIG. 3 is a flow diagram illustrating an exemplary method for training a machine learning model.

FIG. 3 is a flow diagram illustrating an exemplary method 300 for training a machine learning model 124. The method 300 may be performed, at least in part, by a system 100 that includes multiple RPs 106 and at least one baseband controller 104 deployed at a site 102. The method 300 may also be performed by at least one training wireless device 110 at the site 102 as well as a machine learning computing system 120 that implements a machine learning model 124.

The method 300 may be performed before, during, and/or after an online phase. The method 300 may be performed during a single, contiguous period of time, or it may be performed initially then updated where necessary. Optionally, the method 300 may be performed iteratively and/or in parallel instances for more than one physical location in the site 102. In other words, the method 300 may be performed for a plurality of physical locations in the site 102.

The blocks of the flow diagram shown in FIG. 3 have been arranged in a generally sequential manner for ease of explanation; however, it is to be understood that this arrangement is merely exemplary, and it should be recognized that the processing associated with method 300 (and the blocks shown in FIG. 3) can occur in a different order (for example, where at least some of the processing associated with the blocks is performed in parallel and/or in an event-driven manner). Also, most standard exception handling is not described for ease of explanation; however, it is to be understood that method 300 can and typically would include such exception handling.

The method 300 begins in optional step 302 where a training wireless device 110 downloads a mobile application, e.g., to assist with training. The mobile application may present a user interface on the training wireless device 110, and a user may provide input using the user interface.

The method 300 proceeds to step 304 where the training wireless device 110 moves to a physical location within the site 102. The physical locations used for training may generally, but not exclusively, be high-traffic or otherwise important areas in the site 102.

The method 300 proceeds to step 306 where the training wireless device 110 tags the physical location to associate location data 128 (for the physical location) with a timestamp. Specifically, a user may provide user input on the training wireless device 110 indicating the physical location (within the site 102) to tag. The location data 128 may include any data that, at least partially, identifies a physical location, e.g., in a coordinate system. The location data 128 may be entered via the user interface, e.g., by pointing to a physical location on a map of the site 102, selecting a physical location description from a dropdown menu, pressing a radio button identifying a physical location description, etc. The tagging may include associating location data 128 with a timestamp.

The method 300 proceeds to step 308 where the training wireless device 110 transmits the location data 128 (and optionally the timestamp of the tagging) to a machine learning computing system 120. In one configuration, the location data 128 may be manually uploaded to a computing device (not shown) that transmits the location data to machine learning computing system 120, e.g., after multiple or all physical locations that are going to be tagged have been tagged. In an alternative configuration, the location data 128 for each physical location is transmitted wirelessly to the RPs 106, then to the machine learning computing system 120 via the baseband controller 104. In the alternative configuration, the location data 128 for each physical location is wirelessly transmitted as the physical location is visited and tagged by the training wireless device 110.

The method 300 proceeds to step 310 where the training wireless device 110 transmits a training signal 126 that is received by at least one RP(s) 106. The training signal 126 may be an SRS or any other suitable uplink signal. In some configurations, the training signal 126 is transmitted periodically (e.g., every 80-160 ms). In the periodic configuration, a particular training signal 126 may be associated with particular location data 128 based on the timestamp associated with the particular location data 128 (during tagging) as well as a timestamp associated with the signature vector 130 (and optionally the RNTI of the wireless device 110). Alternatively, the training signal 126 may only be sent in response to the user tagging a physical location. The training signal 126 may be received by at least one, and even all, the RPs 106 in the system 100.

The method 300 proceeds to step 312 where the each of the at least one RPs 106 (that receive the training signal 126) determine at least one training signal metric 133 based on the training signal 126. The at least one training signal metric 133 may include a signal strength of the training signal 126, a channel estimate such as a channel impulse response, etc.

The method 300 proceeds to step 314 where a signature vector 130 is determined based on the at least one training signal metric 133 (from each of the at least one RPs 106). In some configurations, the RPs 106 may receive the training signal 126, then each RP 106 may determine and transmit at least one training signal metric 133 characterizing the training signal 126 to the baseband controller 104, which aggregates the training signal metric(s) 133 and determines the signature vector 130 using the training signal metric(s) 133.

After the signature vector 130 is determined, the signature vector 130 (and optionally the timestamp associated with the signature vector) may be transmitted to the machine learning computing system 120, e.g., via the back-haul ETHERNET network 116A. The signature vector 130 may be transmitted to the machine learning computing system 120 by one of the RPs 106 or the baseband controller 104 based on whether the signature vector 130 is determined by the RPs 106 or the baseband controller 104, respectively.

The method 300 proceeds to step 316 where the machine learning computing system 100 may correlate the signature vector 130 and the location data 128 based on data sent from the mobile device (e.g., the location data 128 and timestamp) as well as from the baseband controller 104 (e.g., the signature vector 130 and the timestamp associated with the signature vector 130), and the RNTI (radio network temporary identifier) of the wireless device 110.

The method 300 proceeds to step 318 where a machine learning model 124 is trained based on the correlated signature vector 130 and location data 128. The machine learning model 124 may be a K-Nearest Neighbor (kNN) model, a Support Vector Machine (SVM), or any other model that employs machine learning. In one configuration, the training includes associating location data 128 with the signature vector 130 for the same physical location.

Figure 4:
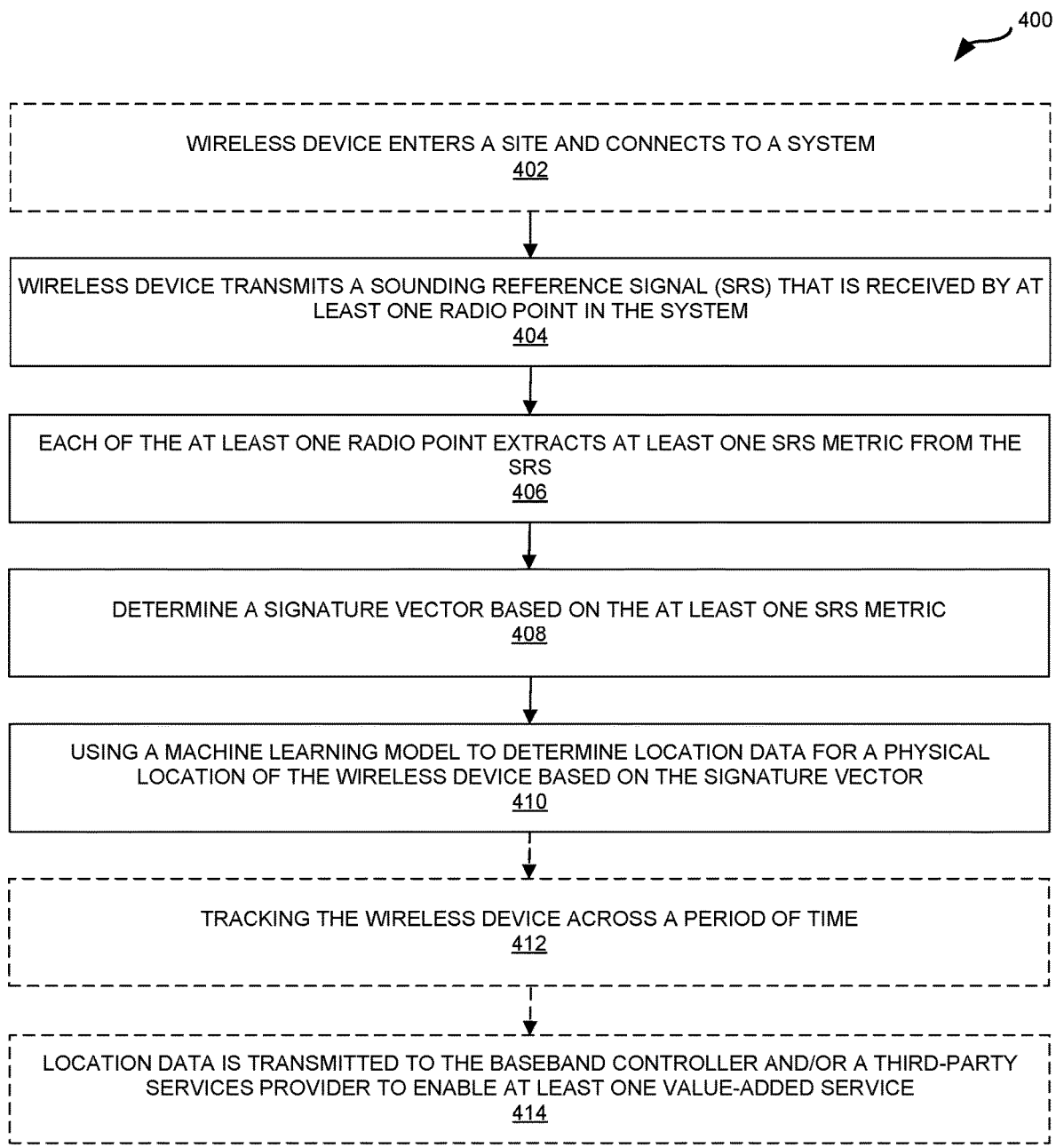
FIG. 4 is a flow diagram illustrating an exemplary method for determining and/or tracking a physical location of a wireless device in a site.

FIG. 4 is a flow diagram illustrating an exemplary method 400 for determining and/or tracking a physical location of a wireless device 110 in a site 102. The method 400 may be performed, at least in part, by a system 100 that includes multiple RPs 106 and at least one baseband controller 104 deployed at a site 102. The method 400 may also be performed by at least one training wireless device 110 at the site 102 as well as a machine learning computing system 120 that implements a machine learning model 124.

The method 400 may be performed before, during, and/or after a training phase, e.g., described in FIG. 3. In some configurations, the method 400 may be performed iteratively and/or in parallel instances for more than one wireless device 110 at the site 102. For example, the method 400 may be performed at least once for each of a plurality of wireless devices 110 at the site 102. For example, the method 400 may be performed every SRS interval per wireless device 110, e.g., every 80-160 ms depending on system 100 load.

Furthermore, the training wireless device(s) 110 used during the training phase 236 may or may not also be used during the online phase 238. In other words, the training phase 236 may involve a first group of one or more training wireless devices 110 and the online phase 238 may involve a second group of one or more wireless devices 110 that may or may not overlap with the first group.

The blocks of the flow diagram shown in FIG. 4 have been arranged in a generally sequential manner for ease of explanation; however, it is to be understood that this arrangement is merely exemplary, and it should be recognized that the processing associated with method 400 (and the blocks shown in FIG. 4) can occur in a different order (for example, where at least some of the processing associated with the blocks is performed in parallel and/or in an event-driven manner). Also, most standard exception handling is not described for ease of explanation; however, it is to be understood that method 400 can and typically would include such exception handling.

The method 400 begins in optional step 402 where a wireless device 110 enters a site 102 and connects to a system 100 (e.g., including initial random access procedures). The method 400 proceeds to step 404 where the wireless device 110 may transmit a Sounding Reference Signal (SRS) 132 (e.g., periodically every 80-160 ms) that is received by at least one RP 106 in the system 100.

The method 400 proceeds to step 406 where each of the at least one RP 106 extracts at least one SRS metric 134 from the SRS 132. The SRS metric(s) 134 extracted by each receiving RP 106 may include one or more of the following: (1) an SRS power measurement; (2) a channel impulse response for the wireless device 110; (3) an angle of arrival for the SRS 132; and/or (4) at least one previous signature vector 130 for the wireless device 110.

The method 400 proceeds to step 408 where a signature vector 130 is determined based on the at least one SRS metric 134. The signature vector 130 may characterize the wireless device's 110 physical location. In some configurations, the SRS metric(s) 134 may be transmitted to the baseband controller 104, which aggregates the SRS metric(s) 134 and determines a signature vector 130.

The signature vector 130 may be transmitted to the machine learning computing system 120, e.g., via the backhaul ETHERNET network 116A. The signature vector 130 may be transmitted to the machine learning computing system 120 by one of the RPs 106 or the baseband controller 104 based on whether the signature vector 130 is determined by the RPs 106 or the baseband controller 104, respectively.

The method 400 proceeds to step 410 where the machine learning computing system 120 uses a machine learning model 124 to determine a physical location (as represented by location data 128) of the wireless device 110 based on the signature vector 130. In other words, the machine learning model 124 may match the signature vector 130 to a closest-matching signature vector 130 measured during a training phase. In one configuration, the machine learning model 124 match the in-phase and out-of-phase given during training. In other words, the machine learning model 124 may determine a mapping that exists between the in-phase and out-of-phase using observations.

Therefore, the machine learning model 124 may identify a physical location using pattern-matching, e.g., where the signature vector 130 may be thought of as a multi-parameter pattern that is matched to a closest pattern of a signature vector 130 measured during training.

The method 400 proceeds to optional step 412 where, in addition to determining a location of a wireless device 110 (e.g., determining a physical location without knowledge of a user's previous physical location), the wireless device 110 is tracked across a period of time, e.g., the wireless device's 110 current physical location is determined, at least in part, based on the wireless device's 110 previous physical location. For example, once a wireless device 110 is located, tracking may be performed by inputting further measurements, as well as at least one previous determined physical location, to the trained machine learning model 124.

The method 400 proceeds to optional step 414 where the location data 128 is transmitted to the baseband controller 104 and/or a third-party services provider to enable at least one value-added service, e.g., spatio-temporal heat map generation, user movement pattern mining, and/or anomaly detection.

The methods and techniques described here may be implemented in digital electronic circuitry, or with a programmable processor (for example, a special-purpose processor or a general-purpose processor such as a computer) firmware, software, or in combinations of them. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instructions to, a data storage system, at least one input device, and at least one output device. Generally, a processor will receive instructions and data from a read-only memory and/or a random access memory. For example, where a computing device is described as performing an action, the computing device may carry out this action using at least one processor executing instructions stored on at least one memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and DVD disks. Any of the foregoing may be supplemented by, or incorporated in, specially-designed application-specific integrated circuits (ASICs).

Terminology

Brief definitions of terms, abbreviations, and phrases used throughout this application are given below.

The term "determining" and its variants may include calculating, extracting, generating, computing, processing, deriving, modeling, investigating, looking up (e.g., looking up in a table, a database or another data structure), ascertaining and the like. Also, "determining" may also include receiving (e.g., receiving information), accessing (e.g., accessing data in a memory) and the like. Also, "determining" may include resolving, selecting, choosing, establishing and the like.

The phrase "based on" does not mean "based only on," unless expressly specified otherwise. In other words, the phrase "based on" describes both "based only on" and "based at least on". Additionally, the term "and/or" means "and" or "or". For example, "A and/or B" can mean "A", "B", or "A and B". Additionally, "A, B, and/or C" can mean "A alone," "B alone," "C alone," "A and B," "A and C," "B and C" or "A, B, and C."

The terms "connected", "coupled", and "communicatively coupled" and related terms are used in an operational sense and are not necessarily limited to a direct physical connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

The phrases "in exemplary configurations", "in example configurations", "in some configurations", "according to some configurations", "in the configurations shown", "in other configurations", "configurations", "in examples", "examples", "in some examples", "some examples" and the like generally mean the particular feature, structure, or characteristic following the phrase is included in at least one configuration of the present disclosure, and may be included in more than one configuration of the present disclosure. In addition, such phrases do not necessarily refer to the same configurations or different configurations.

If the specification states a component or feature "may," "can," "could," or "might" be included or have a characteristic, that particular component or feature is not required to be included or have the characteristic.

In conclusion, the present disclosure provides novel systems, methods, and arrangements for location determination with a C-RAN. While detailed descriptions of one or more configurations of the disclosure have been given above, various alternatives, modifications, and equivalents will be apparent to those skilled in the art without varying from the spirit of the disclosure. For example, while the configurations described above refer to particular features, functions, procedures, components, elements, and/or structures, the scope of this disclosure also includes configurations having different combinations of features, functions, procedures, components, elements, and/or structures, and configurations that do not include all of the described features, functions, procedures, components, elements, and/or structures. Accordingly, the scope of the present disclosure is intended to embrace all such alternatives, modifications, and variations as fall within the scope of the claims, together with all equivalents thereof. Therefore, the above description should not be taken as limiting.

Example Configurations

Example 1 includes a communication system, comprising: a plurality of radio points, each configured to: exchange radio frequency (RF) signals with a wireless device that transmits a Sounding Reference Signal (SRS) from a first physical location in a site; and extract at least one SRS metric from the SRS; a baseband controller communicatively coupled to the plurality of radio points, wherein the baseband controller is configured to determine a signature vector based on the at least one SRS metric from each of the plurality of radio points; and a machine learning computing system communicatively coupled to the baseband controller, wherein the machine learning computing system is configured to use a machine learning model to determine location data for the first physical location of the wireless device based on the signature vector.

Example 2 includes the communication system of Example 1, wherein the at least one SRS metric comprises an SRS power measurement and a channel impulse response, both of which are measured from the SRS.

Example 3 includes the communication system of any of Examples 1-2, wherein the at least one SRS metric comprises at least one of an SRS power measurement, a channel impulse response measured from the SRS, an angle of arrival for the SRS, or at least one previous signature vector for the wireless device.

Example 4 includes the communication system of any of Examples 1-3, wherein determining the location data for the first physical location comprises matching the received signature vector to a closest-matching signature vector measured during a training phase.

Example 5 includes the communication system of any of Examples 1-4, wherein the machine learning computing system is further configured to train the machine learning model during a training phase.

Example 6 includes the communication system of Example 5, wherein, during the training phase, a training wireless device is configured to: move to a training physical location in the site; tag the training physical location to associate location data for the training physical location with a first timestamp; transmit the location data for the training physical location to the machine learning computing system; and transmit a training signal that is received by at least one of the plurality of radio points.

Example 7 includes the communication system of Example 6, wherein, during the training phase, each of the at least one radio point is configured to determine at least one training signal metric based on the training signal; wherein, during the training phase, the baseband controller is further configured to determine a training signature vector based on the at least one training signal metric from the at least one radio point; wherein, during the training phase, the machine learning computing system is further configured to correlate the signature vector with the location data based on the first timestamp, a second timestamp associated with the signature vector, and a radio network temporary identifier (RNTI) of the wireless device; and wherein, during the training phase, the machine learning computing system is further configured to train the machine learning model based on the correlated signature vector and location data that are correlated together.

Example 8 includes the communication system of any of Examples 1-7, wherein the wireless device is further configured to transmit an additional SRS at a second physical location in the site; wherein each of the plurality of radio points is further configured to: receive the additional SRS from the wireless device; and extract at least one additional SRS metric from the additional SRS.

Example 9 includes the communication system of Example 8, wherein the baseband controller is further configured to determine an additional signature vector based on the at least one additional SRS metric from each of the plurality of radio points; and wherein the machine learning computing system is further configured to determine additional location data for the second physical location based on the additional signature vector.

Example 10 includes the communication system of any of Examples 1-9, wherein the plurality of radio points and the baseband controller implement a Long Term Evolution (LTE) Evolved Node B (eNB").

Example 11 includes a method for determining a first physical location of a wireless device, comprising: transmitting, from the wireless device, a Sounding Reference Signal (SRS) from a first physical location, wherein the SRS is received by a plurality of radio points; extracting, by each of the plurality of radio points, at least one SRS metric from the SRS; determining a signature vector based on the at least one SRS metric from each of the plurality of radio points; and using a machine learning model to determine location data for the first physical location of the wireless device based on the signature vector.

Example 12 includes the method of Example 11, wherein the at least one SRS metric comprises an SRS power measurement and a channel impulse response, both of which are measured from the SRS.

Example 13 includes the method of any of Examples 11-12, wherein the at least one SRS metric comprises at least one of an SRS power measurement, a channel impulse response measured from the SRS, an angle of arrival for the SRS, or at least one previous signature vector for the wireless device.

Example 14 includes the method of any of Examples 11-13, wherein determining the location data for the first physical location comprises matching the received signature vector to a closest-matching signature vector measured during a training phase.

Example 15 includes the method of any of Examples 11-14, wherein the machine learning computing system is further configured to train the machine learning model during a training phase.

Example 16 includes the method of Example 15, wherein the training phase comprises: moving, by a training wireless device, to a training physical location in the site; tagging, by a training wireless device, the training physical location to associate location data for the training physical location with a first timestamp; transmitting, by a training wireless device, the location data for the training physical location to the machine learning computing system; and transmitting, by a training wireless device, a training signal that is received by at least one of the plurality of radio points.

Example 17 includes the method of Example 16, wherein the training phase further comprises: determining, by each of the at least one radio point, at least one training signal metric based on the training signal; determining, by the baseband controller, a training signature vector based on the at least one training signal metric from the at least one radio point; and correlating the signature vector with the location data based on the first timestamp, a second timestamp associated with the signature vector, and a radio network temporary identifier (RNTI) of the wireless device; and training, by the machine learning computing system, the machine learning model based on the correlated signature vector and location data for the physical location.

Example 18 includes the method of any of Examples 11-17, further comprising: transmitting, from the wireless device, an additional SRS at a second physical location in the site; receiving, by each of the plurality of radio points, the additional SRS from the wireless device; and extracting, by each of the plurality of radio points, at least one additional SRS metric from the additional SRS.

Example 19 includes the method of Example 18, further comprising: determining, by the baseband controller, an additional signature vector based on the at least one additional SRS metric from each of the plurality of radio points; and determining, by the machine learning computing system, additional location data for the second physical location based on the additional signature vector.

Example 20 includes the method of any of Examples 11-19, wherein the plurality of radio points and the baseband controller implement a Long Term Evolution (LTE) Evolved Node B (eNB").

The invention claimed is:

1. A communication system, comprising:
   a plurality of radio points serving at least a cell, each radio point configured to:
      exchange radio frequency (RF) signals with a wireless device that transmits a Sounding Reference Signal (SRS) from a first physical point location in a site; and
      extract at least one SRS metric from the SRS;
   a baseband controller communicatively coupled to the plurality of radio points, wherein the baseband controller is configured to determine a signature vector based on the at least one SRS metric from each of the plurality of radio points; and
   a machine learning computing system communicatively coupled to the baseband controller, wherein the machine learning computing system is configured to:
      use a machine learning model to determine location data for the first physical point location of the wireless device based on the signature vector for the wireless device and training signature vectors;
      wherein the location data for the first physical point location of the wireless device is further based on user-indicated training physical point locations received from at least one training wireless device, wherein each user-indicated training physical point location is a single point; and
      during a training phase, correlate one of the training signature vectors with training location data based on a first timestamp of when the training location data is associated with the training signature vector and a second timestamp of when the training signature vector is determined at the baseband controller.

2. The communication system of claim 1, wherein the at least one SRS metric comprises an SRS power measurement and a channel impulse response, both of which are measured from the SRS.

3. The communication system of claim 1, wherein the at least one SRS metric comprises at least one of an SRS power measurement, a channel impulse response measured from the SRS, an angle of arrival for the SRS, or at least one previous signature vector for the wireless device.

4. The communication system of claim 1, wherein determining the location data for the first physical point location comprises matching the received signature vector to a closest-matching signature vector measured during the training phase, where each signature vector comprises an element for each of the plurality of radio points.

5. The communication system of claim 1,
   wherein, during the training phase, one of the at least one training wireless device is configured to:
      move to one of the user-indicated training physical point locations in the site;
      tag the user-indicated training physical point location to associate the training location data for the user-indicated training physical point location with the first timestamp;
      transmit the training location data for the user-indicated training physical point location to the machine learning computing system; and
      transmit a training signal that is received by at least one of the plurality of radio points.

6. The communication system of claim 5,
   wherein, during the training phase, each of the at least one radio point is configured to determine at least one training signal metric based on the training signal;
   wherein, during the training phase, the baseband controller is further configured to determine one of the training signature vectors based on the at least one training signal metric from the at least one radio point;
   wherein, during the training phase, the machine learning computing system is further configured to correlate the training signature vector with the location data further based on a radio network temporary identifier (RNTI) of the wireless device; and
   wherein, during the training phase, the machine learning computing system is further configured to train the machine learning model based on the correlated signature vector and the training location data that are correlated together.

7. The communication system of claim 1,
   wherein the wireless device is further configured to transmit an additional SRS at a second physical point location in the site;
   wherein each of the plurality of radio points is further configured to:
      receive the additional SRS from the wireless device; and
      extract at least one additional SRS metric from the additional SRS.

8. The communication system of claim 7,
wherein the baseband controller is further configured to determine an additional signature vector based on the at least one additional SRS metric from each of the plurality of radio points; and
wherein the machine learning computing system is further configured to determine additional location data for the second physical point location based on the additional signature vector.

9. The communication system of claim 1, wherein the plurality of radio points and the baseband controller implement a Long Term Evolution (LTE) Evolved Node B (eNB).

10. The communication system of claim 1,
wherein the baseband controller is further configured to track real-time location data for a plurality of wireless devices at the site over a period of time; and
determine, following the training phase, a heat map that aggregates one or more or more of channel conditions, traffic density, user density, and user movement patterns at the site as a function of location and time based on the real-time location data.

11. The communication system of claim 1, wherein, during the training phase, at least one user tags a respective physical point location associated with each training signature vector by pointing to the respective physical point location on a map of the site displayed on the training wireless device.

12. The communication system of claim 1, wherein the at least one SRS metric comprises at least one previous signature vector for the wireless device.

13. A method for determining a first physical point location of a wireless device, comprising:
transmitting, from the wireless device, a Sounding Reference Signal (SRS) from the first physical point location, wherein the SRS is received by a plurality of radio points in a communication system;
extracting, by each of the plurality of radio points serving at least a cell, at least one SRS metric from the SRS;
determining a signature vector based on the at least one SRS metric from each of the plurality of radio points; and
using a machine learning model to determine location data for the first physical point location of the wireless device based on the signature vector for the wireless device and training signature vectors;
wherein the location data for the first physical point location of the wireless device is further based on user-indicated training physical point locations received from at least one training wireless device,
wherein each user-indicated training physical point location is a single point
during a training phase, correlating one of the training signature vectors with training location data based on a first timestamp of when the training location data is associated with the training signature vector and a second timestamp of when the training signature vector is determined.

14. The method of claim 13, wherein the at least one SRS metric comprises an SRS power measurement and a channel impulse response, both of which are measured from the SRS.

15. The method of claim 13, wherein the at least one SRS metric comprises at least one of an SRS power measurement, a channel impulse response measured from the SRS, an angle of arrival for the SRS, or at least one previous signature vector for the wireless device.

16. The method of claim 13, wherein determining the location data for the first physical point location comprises matching the received signature vector to a closest-matching signature vector measured during the training phase, where each signature vector comprises an element for each of the plurality of radio points.

17. The method of claim 13, wherein the training phase comprises:
moving, by one of the at least one training wireless device, to one of the user-indicated training physical point locations in a site with the radio points;
tagging, by the training wireless device, the user-indicated training physical point location to associate the training location data for the user-indicated training physical point location with the first timestamp;
transmitting, by the training wireless device, the training location data for the user-indicated training physical point location to a machine learning computing system; and
transmitting, by the training wireless device, a training signal that is received by at least one of the plurality of radio points.

18. The method of claim 17, wherein the training phase further comprises:
determining, by each of the at least one radio point, at least one training signal metric based on the training signal;
determining, by a baseband controller in the communication system, one of the training signature vectors based on the at least one training signal metric from the at least one radio point;
correlating the training signature vector with the location data further based on a radio network temporary identifier (RNTI) of the wireless device; and
training, by the machine learning computing system, the machine learning model based on the correlated signature vector and the training location data for the physical point location.

19. The method of claim 13, further comprising:
transmitting, from the wireless device, an additional SRS at a second physical point location in a site with the radio points;
receiving, by each of the plurality of radio points, the additional SRS from the wireless device; and
extracting, by each of the plurality of radio points, at least one additional SRS metric from the additional SRS.

20. The method of claim 19, further comprising:
determining, by a baseband controller in the communication system, an additional signature vector based on the at least one additional SRS metric from each of the plurality of radio points; and
determining additional location data for the second physical point location based on the additional signature vector.

21. The method of claim 13, wherein the plurality of radio points and a baseband controller in the communication system implement a Long Term Evolution (LTE) Evolved Node B (eNB).

* * * * *